United States Patent
Nakayama et al.

(10) Patent No.: US 7,949,468 B2
(45) Date of Patent: May 24, 2011

(54) ROUTE GUIDANCE SYSTEMS, METHODS, AND PROGRAMS

(75) Inventors: Takaaki Nakayama, Okazaki (JP); Shino Oonishi, Okazaki (JP); Kensuke Takeuchi, Okazaki (JP); Daisuke Tanizaki, Okazaki (JP); Kiyohide Kato, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 200 days.

(21) Appl. No.: 11/605,966

(22) Filed: Nov. 30, 2006

(65) Prior Publication Data
US 2007/0124069 A1 May 31, 2007

(30) Foreign Application Priority Data

Nov. 30, 2005 (JP) .................................. 2005-346781

(51) Int. Cl.
*G01C 21/30* (2006.01)

(52) U.S. Cl. ........ 701/211; 701/200; 701/202; 701/205; 701/209; 340/990

(58) Field of Classification Search .................. 701/200, 701/210, 211
See application file for complete search history.

(56) References Cited

U.S. PATENT DOCUMENTS 6,061,628 A * 5/2000 Hayashi et al. ............... 701/208
6,084,543 A * 7/2000 Iizuka ...................... 342/357.13

FOREIGN PATENT DOCUMENTS

| JP | A 06-295399 | 10/1994 |
|----|-------------|---------|
| JP | A-09-178497 | 7/1997 |
| JP | A-10-274544 | 10/1998 |
| JP | A-11-257992 | 9/1999 |
| JP | A-2002-156242 | 5/2002 |
| JP | A-2003-121185 | 4/2003 |

* cited by examiner

*Primary Examiner* — Mark Hellner
*Assistant Examiner* — Redhwan Mawari
(74) *Attorney, Agent, or Firm* — Oliff & Berridge, PLC

(57) ABSTRACT

Route guidance systems, methods, and programs detect a current position of a vehicle and search for a route to a destination on the basis of the vehicle position. The systems, methods, and programs set a guidance point at a predetermined distance before a target point on the searched route. If a guidance condition is met, the systems, methods, and programs provide route guidance about the target point when the vehicle reaches the guidance point, the guidance condition being met on the basis of the presence or absence of traffic lights at each of at least one intersection between the guidance point and the target point. If the guidance condition is met, the systems, methods, and programs output route guidance, the content of the route guidance being preset based on the guidance condition.

6 Claims, 8 Drawing Sheets

PLEASE TURN LEFT AT THE NEXT TRAFFIC LIGHT

ROUTE GUIDANCE SYSTEMS, METHODS, AND PROGRAMS

INCORPORATION BY REFERENCE

The disclosure of Japanese Patent Application No. 2005-346781 filed on Nov. 30, 2005, including the specification, drawings and abstract thereof, is incorporated herein by reference in its entirety.

BACKGROUND

1. Related Technical Fields

Related technical fields include route guidance systems, methods, and programs.

2. Description of the Related Art

A navigation apparatus mounted on a vehicle detects a current position of the vehicle by GPS (global positioning system), reads out map data from a data storing section, displays a map screen on a display section, and displays the vehicle position indicating the current position of the vehicle on a map of the area surrounding the vehicle. Therefore, a driver of the vehicle may drive the vehicle using the vehicle position displayed on the map as an aid.

When the driver inputs a destination and sets a route search condition, a route from the current position as a starting point to the destination is searched on the basis of the search condition. The searched route is displayed together with the vehicle position on the map, and the driver is provided guidance along the searched route. Therefore, the driver may drive the vehicle following the searched route.

According to the route guidance, for example, when the driver needs to make a right or left turn at a predetermined turn intersection, audio guidance is output before the vehicle arrives at the turn intersection. To output the audio guidance, one or more route guidance points are set between the vehicle and the turn intersection on the searched route. The route guidance points are more than a predetermined distance away from each other. When the vehicle arrives at each of the route guidance points, a preset audio guidance for each route guidance point is output. See, for example, Japanese Unexamined Patent Application Publication No. H6-295399.

FIG. 2 is a diagram showing route guidance provided by a conventional navigation apparatus. FIG. 3 is a diagram showing a first example of possible route guidance provided by a conventional navigation apparatus. FIG. 4 is a second example of possible route guidance provided by a conventional navigation apparatus.

In FIGS. 2-4, "pr" denotes a vehicle position, "ri" (i=1, 2, . . . ) denotes a road, "crj" (j=1, 2, . . . ) denotes an intersection at which two or more predetermined roads intersect, and "sgk" (k=1, 2, . . . ) denotes a traffic light. Further, "Rt" denotes a searched route, and "h1" denotes a route guidance point set on the searched route Rt.

For example, when audio guidance such as "Please turn left at the second intersection with a traffic light," is output at the route guidance point h1, it is difficult for the driver to determine which intersection is "the second intersection with a traffic light". That is, in the case of counting only intersections cr2 and cr3 which have traffic lights sg1 and sg2, "the second intersection with a traffic light" means the intersection cr3, so that the searched route Rt may be the route as shown in FIG. 3. However, in the case of counting the intersections cr2 and cr3 which have the traffic lights sg1 and sg2 as well as an intersection cr1 without a traffic light, "the second intersection with a traffic light" here means the intersection cr2, so that the searched route Rt may be the route as shown in FIG. 4. Therefore, the driver may be confused which intersection to turn at is the turn intersection.

SUMMARY

As described above, the conventional navigation apparatus normally provides route guidance about the turn intersection at each of the route guidance points on the basis of the number of intersections between the vehicle position and the turn intersection. If the turn intersection has a traffic light and if there are intersections with and without traffic lights between the vehicle position and the turn intersection, it is difficult for the driver to recognize which intersection should be counted, so that the driver may confuse the turn intersection with another one.

Accordingly, various exemplary implementations of the principles described herein provide a route guidance system and a route guidance method for making a driver recognize the correct turn intersection.

Various exemplary implementations provide route guidance systems, methods, and programs that may detect a current position of a vehicle and may search for a route to a destination on the basis of the vehicle position. The systems, methods, and programs may set a guidance point at a predetermined distance before a target point on the searched route. If a guidance condition is met, the systems, methods, and programs may provide route guidance about the target point when the vehicle reaches the guidance point, the guidance condition being met on the basis of the presence or absence of traffic lights at each of at least one intersection between the guidance point and the target point. If the guidance condition is met, the systems, methods, and programs may output route guidance, the content of the route guidance being preset based on the guidance condition.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
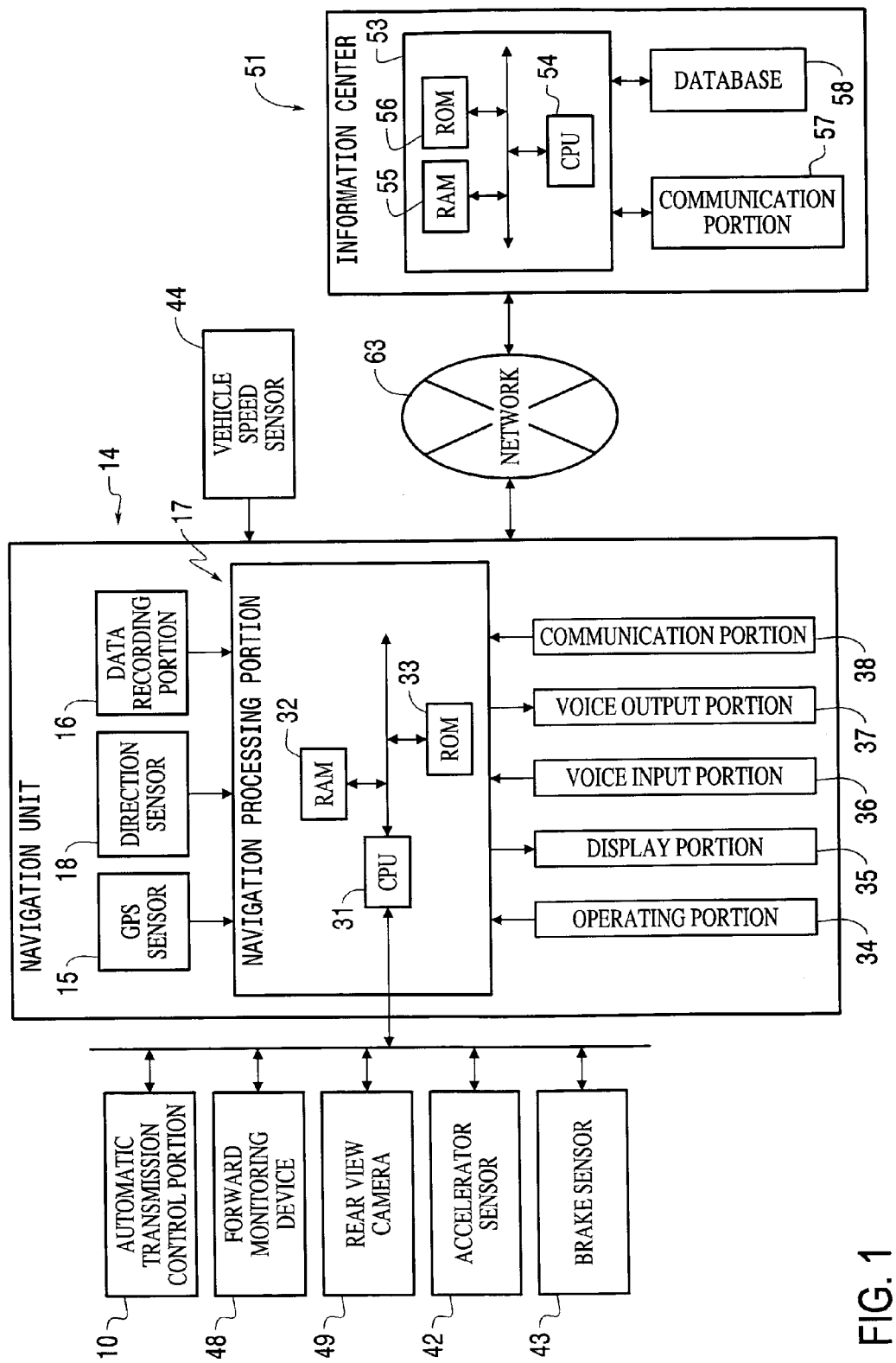
FIG. 1 is a diagram of an exemplary navigation system.
Figure 2:
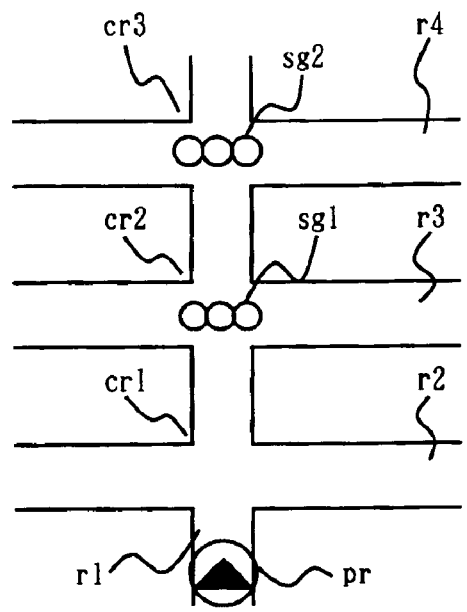
FIG. 2 is a diagram showing route guidance provided by a conventional navigation apparatus.
Figure 3:
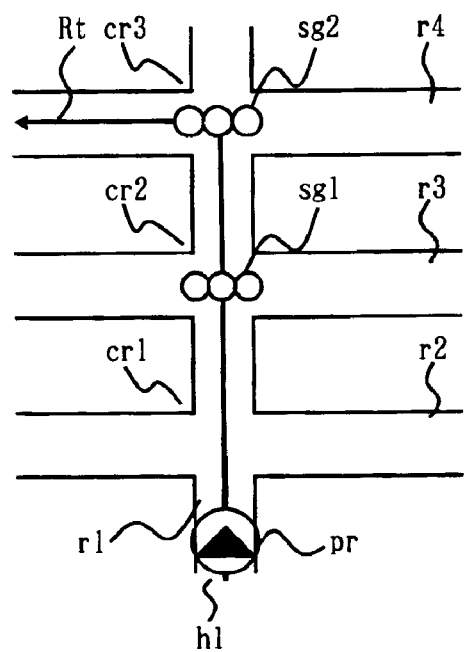
FIG. 3 is a diagram showing route guidance provided by a conventional navigation apparatus.
Figure 4:
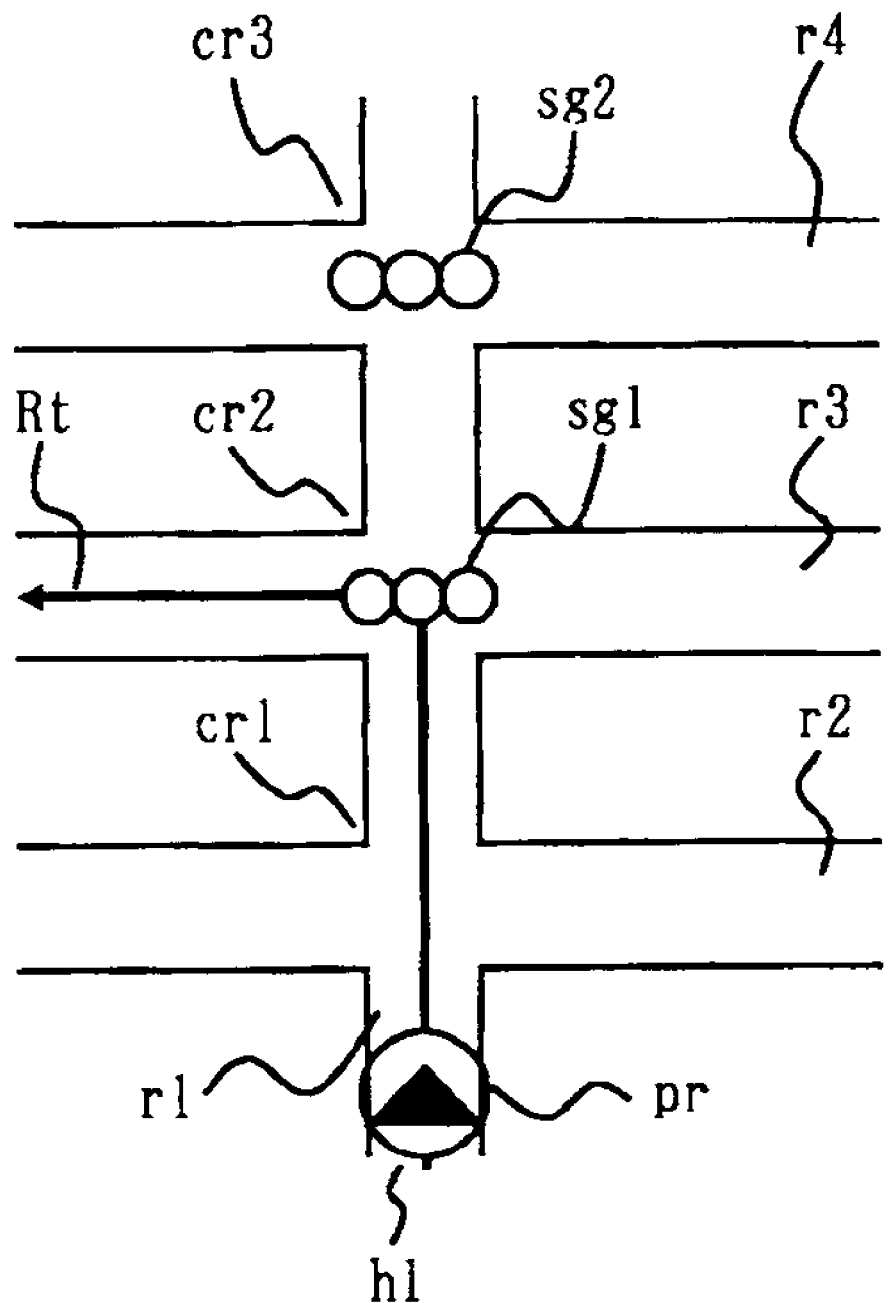
FIG. 4 is a diagram showing route guidance provided by a conventional navigation apparatus.

FIG. 1 shows an exemplary navigation system. As shown in FIG. 1, the navigation system may include, for example, an automatic transmission control portion 10. The automatic transmission control portion 10 may control a power train for changing gear at a predetermined transmission gear ratio such as, for example, a continuously variable transmission (CVT), an automatic transmission, and/or an electric drive system.

The navigation system may include, for example, an information terminal such as, for example, an on-board navigation unit 14 mounted on a vehicle. The navigation system may include, for example, a network 63 and an information center 51 as an information provider.

The navigation unit 14 may include, for example, a GPS sensor 15 for detecting a current position of the vehicle, a memory (e.g., data storing portion 16) for storing map data and various types of information, and a controller (e.g., navigation processing portion 17) for performing various calculations such as navigation processing on the basis of input information. The navigation unit 14 may include, for example, a direction sensor 18 for detecting a vehicle direction, an operating portion 34 for receiving input from a user, a display portion 35 for displaying various images on a screen (not shown) to guide the driver, and an audio input portion (e.g., voice output portion 36) for performing audio input. The navigation unit 14 may include, for example, an audio output portion (e.g., voice output portion 37) for outputting various audio messages to aid the driver and a communication portion 38. The GPS sensor 15, the data recording portion 16, the direction sensor 18, the operating portion 34, the display portion 35, the audio input portion 36, the audio output portion 37, and the communication portion 38 may be connected to the navigation processing portion 17.

The automatic transmission control portion 10, a forward monitoring device 48 that is mounted at a predetermined position in the front part of the vehicle for monitoring the area in front of the vehicle, a rear view camera 49 that is mounted at a predetermined position in the rear part of the vehicle, an accelerator sensor 42 for detecting the degree of opening of an accelerator pedal (not shown), a brake sensor 43 for detecting the level of braking applied to the vehicle through a brake pedal (not shown), and a vehicle speed sensor 44 for detecting the vehicle speed may also be connected to the navigation processing portion 17. Note that, for example, the accelerator sensor 42 and the brake sensor 43 may detect information related to vehicle operation by the driver.

The GPS sensor 15 may detect a current position on the earth by receiving a radio wave from a satellite and may also detect a time. However, a distance sensor, a steering sensor, and/or an altimeter (not shown) may be used independently or together instead of the GPS sensor 15. A gyro sensor or a geomagnetic sensor may be used as the direction sensor 18. Note that, these sensors are not needed when the GPS sensor has a function of detecting, for example, a vehicle direction and a vehicle speed.

The data storing portion 16 may include a map database including a map data file to store map data therein. The map data may include intersection data regarding intersections, node data regarding nodes, road data regarding road links, search data processed for searching, facility data regarding facilities, and feature data regarding features on a road. As used herein, the term "road link" refers to, for example, a road or portion of a road. For example, according to one type of road data, each road may consist of a plurality of componential units called links. Each link may be separated and defined by "nodes," for example, an intersection, an intersection having more than three roads, a curve, and/or a point at which the road type changes.

Road features may include an object set or formed on a road that provides travel information to the driver or that provides travel guidance to the driver such as, for example, a line, a road sign, a crosswalk, a manhole, and/or a traffic light. The line may be a stop line indicating where a vehicle should stop, a line separating vehicular lanes, or a line indicating a parking space. The road sign may be an information sign indicating a direction of a lane by means of an arrow, a warning sign such as "STOP" to notify the driver of a stop line or a direction sign such as "the direction of XX" to provide directions to a location. The feature data may include position information indicating the positions of features by means of coordinates and/or image information indicating features by means of images. Note that, the stop line may include an entrance from a non-priority road to a priority road, a railroad crossing, and/or an intersection with a blinking red light.

The road data regarding the lanes may include lane data such as a lane number for each lane on roads and/or lane position information. The data storing portion 16 may store data for outputting predetermined information by the voice output portion 37.

Further, the data storing portion 16 may include a statistical database including a statistical data file and/or a travel history database including a travel history data file, and statistical data is stored in the statistical data file as past record data as is travel history data in the travel history data file.

The statistical data may include a past record of traffic information, that is, history information indicating travel history. The statistical data may include various types of information, that is, for example, past traffic information provided by a road traffic information center (not shown) such as a VICS (Vehicle Information and Communication System), road traffic census information indicating traffic volume obtained by a road traffic census provided by the National Land and Transportation Ministry, and road timetable information provided by the National Land and Transportation Ministry, and such information may be used individually/collectively, modified, or undergo statistical processing, if needed. Note that, congestion prediction information for predicting traffic congestion may be added to the statistical data. In that case, detailed conditions such as date and time, day of the week, weather, various events, season, facility information (presence or absence of large facilities such as a department store and/or a supermarket) may be added to the history information to create the statistical data.

As data items for the statistical data, a link number for each of a plurality of road links, a direction flag indicating a travel direction, a type of information, a congestion degree at each of a plurality of predetermined times, a link required travel times indicating the lengths of time required to travel the road links at predetermined times, and/or average data of the link required time for each day of the week may be included.

The travel history data may be collected from a plurality of vehicles, that is, from the vehicle mounted with the navigation apparatus and/or other vehicles, by the information center 51. The travel history data may include past record information indicating the travel record of roads along which each vehicle has traveled and is calculated and stored as probe data on the basis of travel data.

As data items for the travel history data, a link required travel time and a congestion degree for each road link at a predetermined time may be included. Note that, the travel history data may be added to the statistical data. Further, the congestion degree may be displayed as a congestion indicator, for example, "congested," "crowded," and "not congested," indicating the degree of traffic congestion.

The data storing portion 16 may include a disk (not shown) such as a hard disk, a CD, a DVD, or an optical disk to store the various data described above and also include a head (not shown) such as a readout/writing head to read out/write various data. For example, a memory card may be used as the data storing portion 16. Note that, an external storage device or a memory card may be one of the disks described above.

The map database, the statistical database, and the travel history database may be included in the data storing portion 16. However, one or more of the map database, the statistical database, and the travel history database may be included in the information center 51 instead.

The navigation processing portion 17 may include, for example, a CPU 31 as a control device as well as a calculating device for controlling the whole navigation apparatus 14, a RAM 32 as a working memory for helping the CPU 31 to perform various calculations, a ROM 33 for storing a control program and various programs for searching for a route to a destination or for route guidance, and a flash memory (not shown) for storing various data and programs. Note that, an internal storage device may be the RAM 32, the ROM 33, or the flash memory.

Various programs may be stored in the ROM 33 and various data may be stored in the data storing portion 16. However, such programs and data may be stored on, for example, a disk. In this case, the programs and/or data may be read out from the disk and may be written to a flash memory. Therefore, the programs and/or data may be updated by changing the disk. Further, control program and/or data of the automatic transmission control portion 10 may be stored on the disk as well. Then the programs and data may be received through the communication portion 38 and stored in the flash memory of the navigation processing portion 17.

By the driver's operation, the operating portion 34 may be used for correcting a current position when the vehicle starts moving, inputting a starting point and a destination, inputting a point to be passed, and activating the communication portion 38. A keyboard or a mouse that is different from the display portion 35 may be used as the operating portion 34. Also, a touch panel with image operating portions such as various keys, switches, and buttons may be used as the operating portion 34. Such keys, switches, and buttons may be displayed on a screen of the display portion 35 and touched or clicked for a predetermined input operation.

A display may be used as the display portion 35. In various screens displayed on the display portion 35, for example, a current position of the vehicle as a vehicle position, a vehicle direction, a map, a searched route, guide information along the searched route, traffic information, a distance to a next intersection on the searched route, and/or a travel direction at the next intersection may be displayed. Further, operating instructions and guidance of operating menu/keys of the image operating portion, the operating portion 34, and the audio input portion 36 as well as an FM multiplex telecasting program name may be displayed in the various screens of the display portion 35.

The voice input portion 36 may include a microphone (not shown) to input necessary information by audio. The voice output portion 37 includes a speech synthesis device and a speaker (not shown) to output an audio message synthesized by the speech synthesis device for, for example, the searched route, guidance information, and/or traffic information.

The communication portion 38 may include a beacon receiver and/or an FM receiver. The beacon receiver (for example, electric wave beacon and/or optical beacon) may receive various types of information such as current traffic information and general information sent from, for example, the road traffic information center via, for example, an electric wave beacon device and/or optical beacon device provided along a road. The FM receiver may also receive such information as multiple broadcasts via an FM broadcast station. The traffic information may include, for example, congestion information, road sign information, parking lot information, traffic accident information, and/or information on the busy status of service areas. The general information may include, for example, news and weather reports. The beacon receiver and the FM receiver may be one unit provided as a VICS receiver, or each may be provided separately.

The traffic information may include a type of information, a mesh number to specify a mesh, a link number for specifying a road link which connects two points, for example, two intersections and for indicating the difference between inbound and outbound traffic on the road link, and link information indicating information corresponding to the link number. For example, when traffic information is congestion information, the link information may include data about the head of a traffic jam indicating a distance from the start point of the road link to the head of the traffic jam, the congestion degree, the length of the traffic jam indicating the distance from the head of the traffic jam to the end of the traffic jam, and a link required travel time indicating the length of time required to travel the road link.

The communication portion 38 may receive the map data, the statistical data, the travel history data, and various information such as traffic information and general information from the information center 51 through the network 63.

The information center 51 may include, for example, a controller (e.g., server 53), a communication portion 57 connected to the server 53, and memory (e.g., database (DB) 58). The server 53 may include a CPU 54, an RAM 55, and an ROM 56 as a control device and a calculating device. Data the same as the various data stored in the data storing portion 16 such as the map data, the statistical data, and the travel history data may be stored in the database 58. The information center 51 may provide current traffic information and various information such as general information sent from the road traffic information center and travel history data collected from a plurality of vehicles (the vehicle mounted with the navigation apparatus and/or other vehicles) in real time.

The forward monitoring device 48 may include a laser radar, a radar such as a millimeter wave radar, and/or a supersonic sensor, and such radars and sensors may be used individually or collectively to monitor a vehicle in front of the vehicle mounted with the navigation apparatus, a stop line, and/or an obstacle. The forward monitoring device 48 may detect a relative vehicle speed to the vehicle in front of the vehicle mounted with the navigation apparatus, an approach speed to a stop sign/obstacle as area information and calculates the distance between both vehicles and the time required to reach the next vehicle.

The rear view camera 49 including a CCD sensor is attached to the rear part of the vehicle and the optic axis of the rear view camera 49 is directed downward to monitor the area behind the vehicle. The rear view camera 49 may image a vehicle traveling behind the vehicle mounted with the navigation apparatus, a building on the side of the road, and/or a structural object as well as a feature, create image data of such an object, and send the image data to the CPU 31. The CPU 31 may read the image data, execute image processing, and determine each of the objects in the image as a specific object. A C-MOS sensor may be used instead of a CCD sensor.

Note that, the navigation system, the navigation processing portion 17, the CPUs 31 and 54, and the server 53 may function as a controller individually or collectively to execute processing using various programs and data. The data storing portion 16, the RAMs 32 and 55, the ROMs 33 and 56, the database 58, and/or the flash memory may function as a memory. For example, an MPU may be used as a processing device instead of the CPUs 31 and 54.

Next, a basic operation of the navigation system with the structure determined as described above will be described.

When the navigation apparatus 14 is activated by the driver' operation of the operating portion 34, the CPU 31 may read a current vehicle position detected by the GPS sensor 15 and a vehicle position detected by the direction sensor 18, and may initialize various data. Next, the CPU 31 may determine on which road link the current position is located on the basis of a movement locus of the current position, and a shape and a position of each road link of roads around the current position, and may specify the current position. The current position may be specified, for example, on the basis of positions of each feature that is imaged by the rear camera 49.

The CPU 31 may read image data from the rear camera 49 and may recognize a feature in an image within the image data. The CPU 31 may calculate the distance between the rear camera 49 and the actual feature on the basis of the position of the feature in the image. The CPU 31 may then read the distance described above, further read feature data from the data storing portion 16, obtain the coordinates of the feature, and specify the current position on the basis of the coordinates and the distance.

The CPU 31 may detect a current traveling lane on the basis of the recognized feature in the image data and the feature data read out from the data storing portion 16.

Note that, the CPU 31 may read an output from the geomagnetic sensor, determine whether there is an object which is made of a ferromagnetic material such as a predetermined manhole on the road on the basis of the output from the sensor, and detect a traveling lane on the basis of the determination. Further, the current position may be detected with high accuracy by using the high-precision GPS sensor 15. As a result, the traveling lane may be detected on the basis of the result of the detection of the current position. If needed, while image processing is executed for image data of display lines, the traveling lane may be detected by using the output from the geomagnetic sensor and the current position collectively.

The CPU 31 may read out and obtain the map data from the data storing portion 16 or to receive and obtain the map data from the information center 51 through the communication portion 38. Note that, when obtaining the map data from the information center 51, the CPU 31 may download the received map data on a flash memory.

The CPU 31 may display various screens on the display portion 35. For example, the CPU 31 may display a map screen on the display portion 35 and display an area map as well as the current vehicle position and the vehicle direction on the map screen. As a result, the driver may drive the vehicle on the basis of the map, the vehicle position, and the vehicle direction.

When the driver inputs a destination by operating the operating portion 34, the CPU 31 may set the destination. If needed, a starting point may be input and set. Further, if a predetermined point is stored in advance, the stored point may be set as a destination. When the driver inputs a search condition by operating the operating portion 34, the CPU 31 may set a search condition.

After setting the destination and the search condition, the CPU 31 may read out the current position, the destination, and the search condition, read search data from the data storing portion 16, search for a route from the starting point (e.g., the current position) to the destination on the basis of the search condition, the read current position, the destination, and the search data. The CPU 31 may then output route data indicating the searched route. In this case, a route that has the minimum total amount of link costs for road links on the route may be chosen as the search route.

When a road has a plurality of lanes and a current traveling lane is detected among the lanes, the CPU 31 may search for a route including the traveling lane. In this case, the lane number of the traveling lane may be included in the route data.

Note that, the information center 51 may execute route searching processing. The CPU 31 may send the current position, the destination, and the search condition to the information center 51. After the information center 51 receives the current position, the destination, and the search condition, the CPU 54 may read out search data from the database 58, searches for a route from the starting point to the destination on the search condition on the basis of the current position, the destination, an the search data, and outputs route data indicating the searched route. Then the CPU 54 may send the route data to the navigation apparatus 14.

The CPU 31 may provide guidance along the route. The CPU 31 may read the route data and may display the searched route on the map screen on the basis of the route data.

When the vehicle needs to turn right or left at a predetermined intersection while the route guidance is performed, the intersection is set as a guidance target point and as a turn intersection. The CPU 31 may determine whether there is an intersection at which the vehicle needs to turn right or left on the basis of the searched route of the route data. When there is such intersection, the intersection may be set as the turn intersection by the CPU 31. Note that, as the turn intersection, any intersection at which an entering road and a plurality of exiting roads are crossed with each other such as a junction of three roads, a right angle cross road, and a junction of five roads may be included.

When the route is searched at the lane level, the CPU 31 may recommend a lane. For example, a recommended traveling lane for passing through the turn intersection such as a suitable lane for entering to the turn intersection or a suitable lane for leaving from the turn intersection may be selected and set as a recommended lane. The CPU 31 may display the searched route on the map screen, display an enlarged view of the traveling road of the vehicle in a predetermined range of the map screen, and perform the lane guidance using the road enlarged view. In the road enlarged view, each lane and the set recommended lane may be displayed.

The CPU 31 may output audio route guidance from the voice outputting portion 37. The CPU 31 may set one or more than one route guidance points at each point which is in front of the turn intersection on the searched route and is a predetermined distance away from each other. When the vehicle arrives at each of the route guidance points, the route guidance for the turn intersection whose content is preset corresponding to each of the route guidance points may be performed. For example, a route guidance for a distance from the vehicle position to the turn intersection or for a right or left turn at the turn intersection may be performed. When a recommended lane is set, The CPU 31 may perform the lane guidance whose content is preset corresponding to each of the route guidance points. For example, the lane guidance for each of recommended lanes between the vehicle position and the turn intersection or the lane guidance for a recommended lane coming after the turn intersection may be performed.

The CPU 31 may read out intersection data, display an enlarged view of the turn intersection within a predetermined area of the map screen before the vehicle arrives at the turn intersection, and perform route guidance using the intersection enlarged view. In this case, an area map around the turn intersection, the searched route, and a landmark such as a facility for recognizing the turn intersection may be displayed on the intersection enlarged view. When the entering road and/or the exiting roads at the turn intersection have a plurality of lanes and the lane guidance is being performed, The CPU 31 may display a recommended lane on the intersection enlarged view. Therefore, the intersection data may include data of the name of the intersection, the entering road, the exiting roads, a presence or absence of a traffic light, and the type of the traffic light.

The route guidance about the turn intersection may be performed at each of the route guidance points on the basis of the number of intersections existing between the vehicle position and the turn intersection. However, when there is a traffic light at the turn intersection and there are intersections with and without traffic lights between the vehicle position and the turn intersection, it may be difficult for the driver to determine which intersection should be counted. As a result, the driver may recognize a wrong intersection as the turn intersection.

An exemplary route guidance method will be described with reference to FIGS. 5-15. The exemplary method may be implemented, for example, by one or more components of the above-described system. However, even though the exemplary structure of the above-described system may be referenced in the description, it should be appreciated that the structure is exemplary and the exemplary method need not be limited by any of the above-described exemplary structure.

Figure 5:
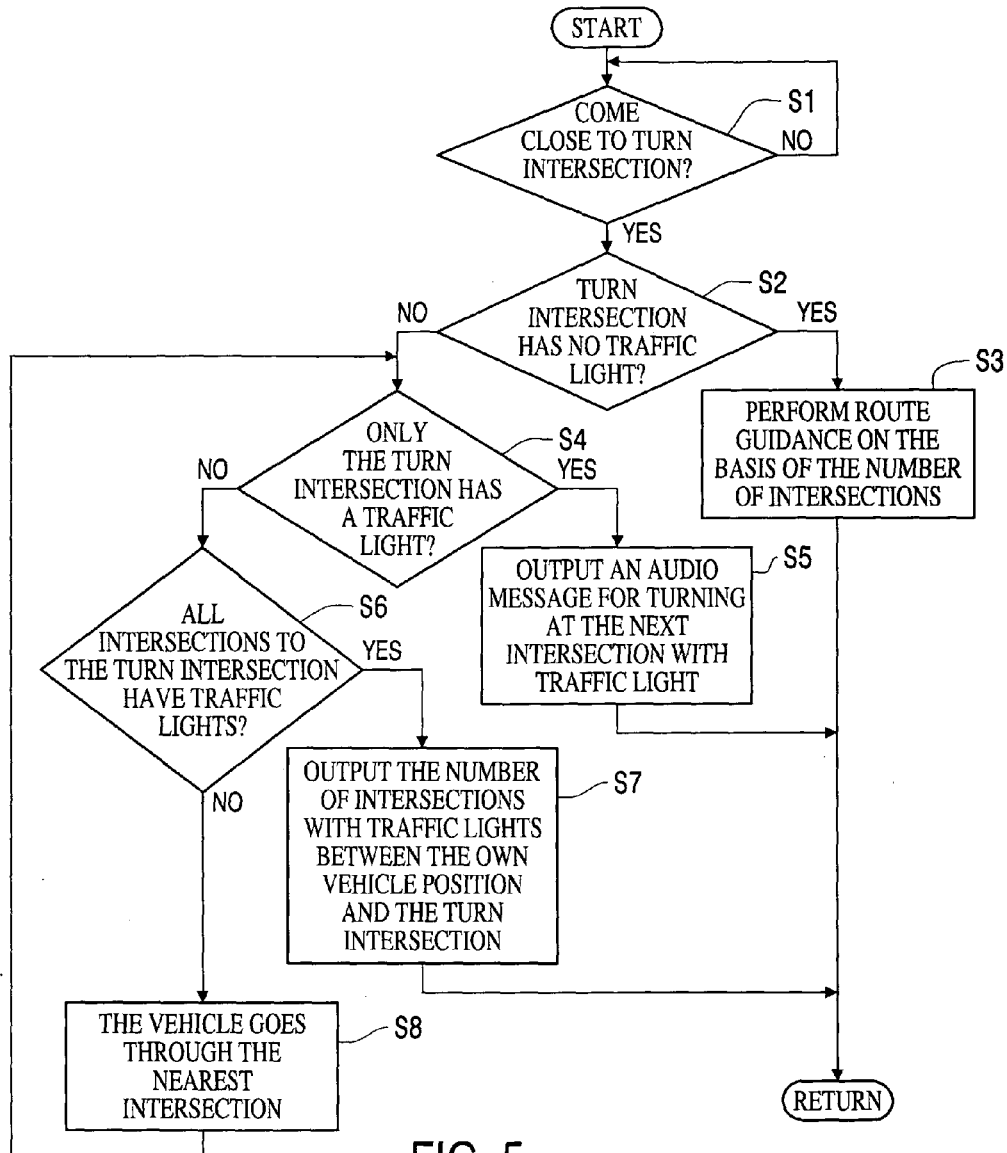
FIG. 5 is a flowchart showing an exemplary route guidance method.
Figure 6:
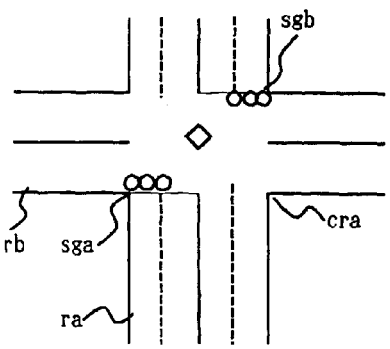
FIG. 6 is a diagram showing an exemplary traffic light layout.
Figure 7:
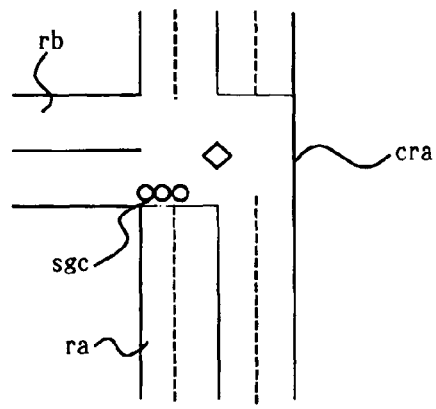
FIG. 7 is a diagram showing an exemplary traffic light layout.
Figure 8:
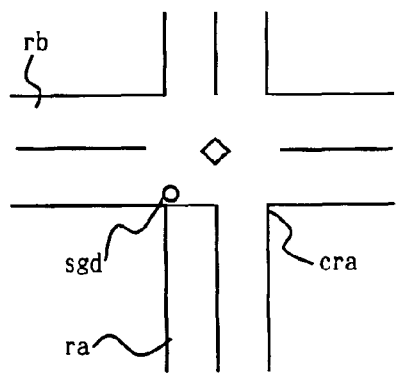
FIG. 8 is a diagram showing an exemplary traffic light layout.
Figure 9:
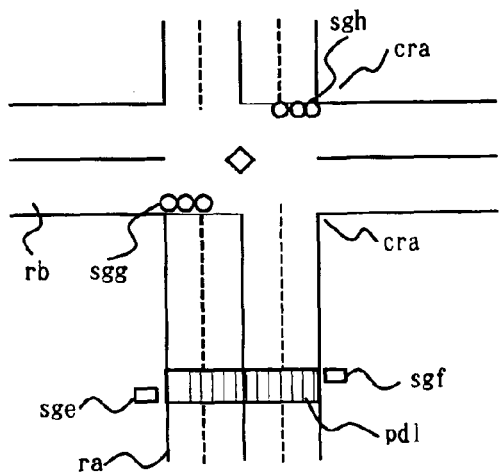
FIG. 9 is a diagram showing an exemplary traffic light layout.
Figure 10:
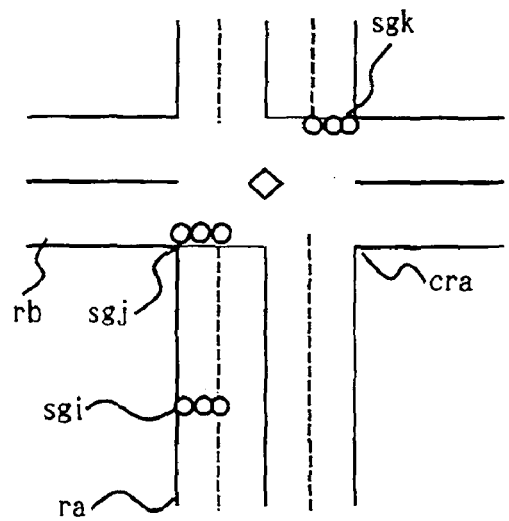
FIG. 10 is a diagram showing an exemplary traffic light layout.

FIG. 5 is a flowchart showing the exemplary method. FIGS. 6-10 show exemplary traffic light layouts. FIGS. 11-15 show examples of guidance.

In FIGS. 6-10, "ra" and "rb" are roads, "cra" is an intersection at which the road ra and rb are crossed with each other, "sga"-"sgk" are traffic lights, and "pd1" is a crosswalk. Among the traffic lights sga-sgk, traffic lights sga-sgc, sgg-sgh, and sgj-sgk are traffic lights that have three lights and belong to the intersection cra. A traffic light sgd is a traffic light that has one light and belongs to the intersection cra. Traffic lights sge and sgf are signals for pedestrians that belong to a crosswalk pd1, not to the intersection cra. The traffic light sgi is a traffic light that is located in front of the intersection cra to give notice of the existence of the intersection cra.

In FIGS. 11-15, "pr" is a vehicle position, "ri" (i=1, 2, ... ) is a road, "crj" (j=1, 2, ... ) is an intersection at which more than two predetermined roads are crossed with each other, and "sgk" (k=1, 2, ... ) is a traffic light. "Rt" is a searched route, "c1" is a turn intersection indicating an intersection that is set on the searched route Rt1 and at which the vehicle turns right/left among the intersections "crj." "h1" and "h2" are route guidance points set in front of the turn intersection c1 on the searched route Rt.

Figure 11:
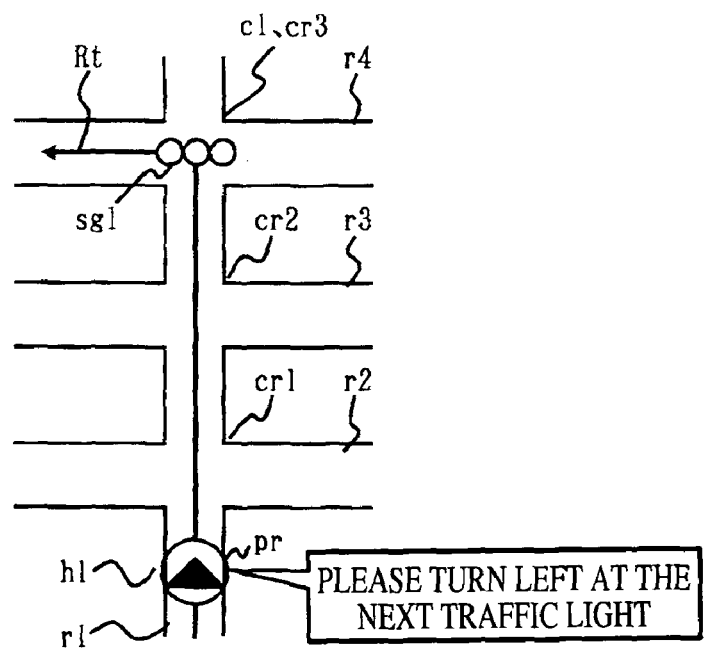
FIG. 11 is a diagram showing an example of guidance.

In FIG. 11, the roads r1 and r2 cross each other at the intersection cr1. The roads r1 and r3 cross each other at the intersection cr2. The roads r1 and r4 cross each other at the intersection cr3. The searched route Rt follows road r1 and turns left at the intersection cr3. The intersection cr3 is the turn intersection c1. The intersections cr1 and cr2 do not have traffic lights and the intersection cr3 has the traffic light sg1.

Figure 12:
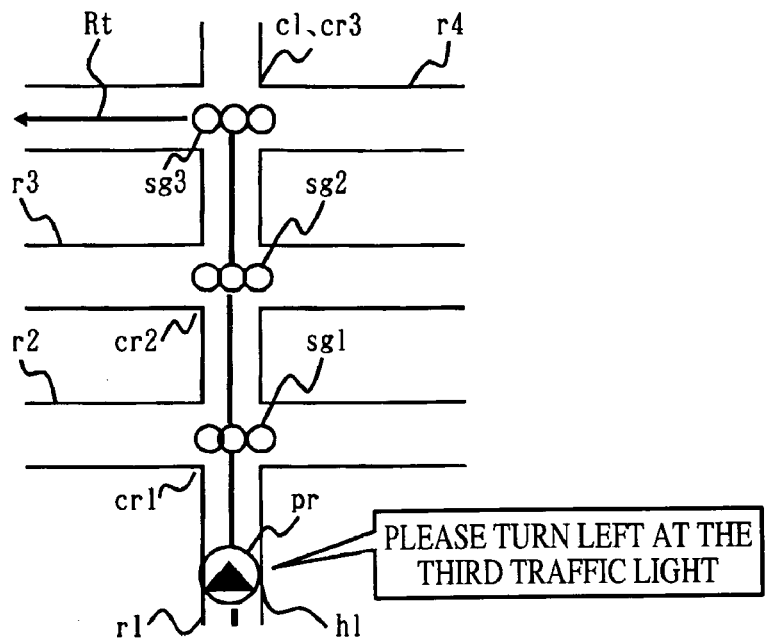
FIG. 12 is a diagram showing an example of guidance.

In FIG. 12, the roads r1 and r2 cross each other at the intersection cr1. The roads r1 and r3 cross each other at the intersection cr2. The roads r1 and r4 cross each other at the intersection cr3. The searched route Rt follows road r1 and turns to left at the intersection cr3. The intersection cr3 is the turn intersection c1. The intersections cr1 through cr3 have the traffic lights sg1 through sg3.

Figure 13:
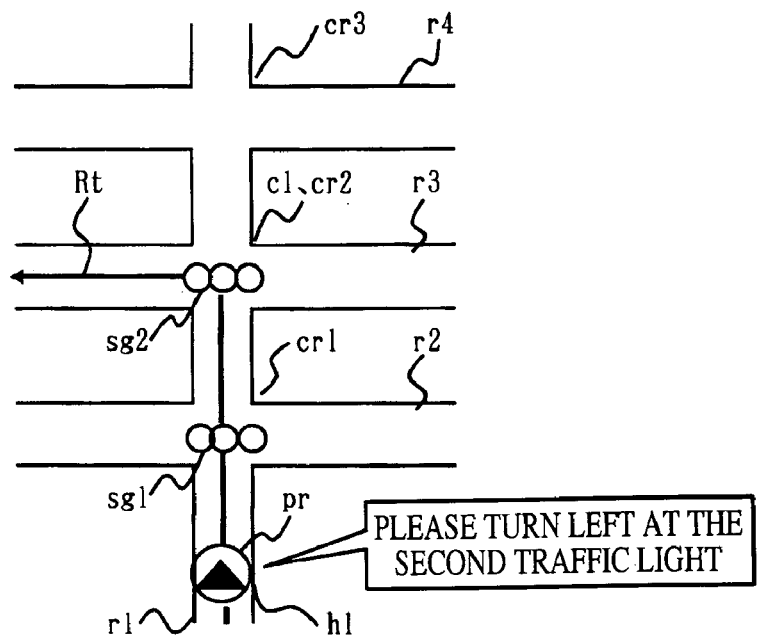
FIG. 13 is a diagram showing an example of guidance.

In FIG. 13, the roads r1 and r2 cross each other at the intersection cr1. The roads r1 and r3 cross each other at the intersection cr2. The roads r1 and r4 cross each other at the intersection cr3. The searched route Rt follows road r1 and turns left at the intersection cr2. The intersection cr2 is the turn intersection c1. The intersections cr1 and cr2 have the traffic lights sg1 and sg2, but the intersection cr3 does not have a traffic light.

Figure 14:
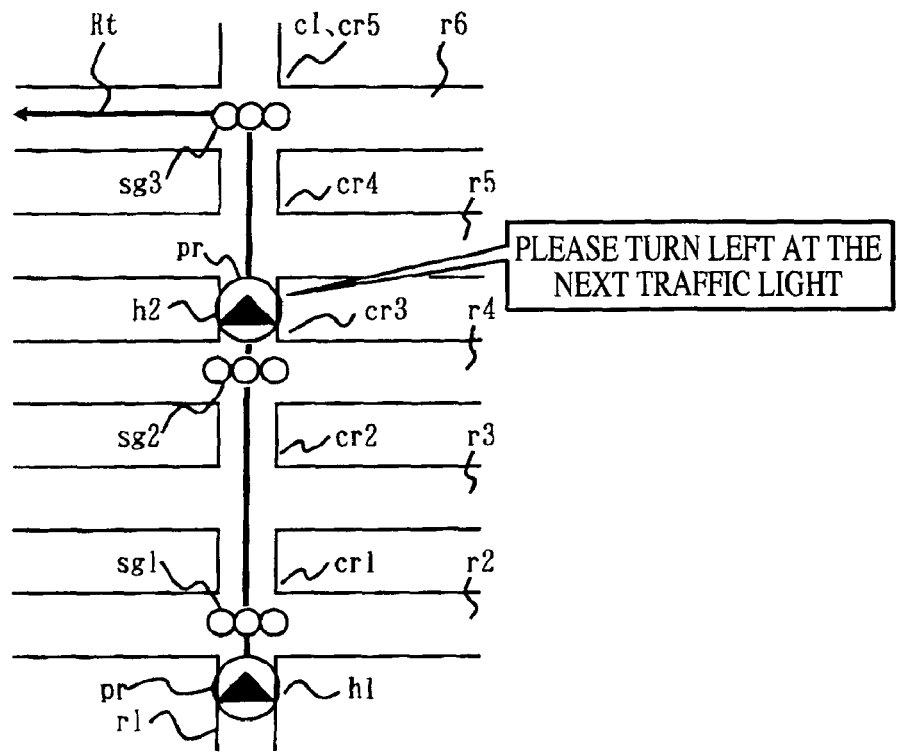
FIG. 14 is a diagram showing an example of guidance.

FIG. 14, the roads r1 and r2 cross each other at the intersection cr1. The roads r1 and r3 cross each other at the intersection cr2. The roads r1 and r4 cross each other at the intersection cr3. The roads r1 and r5 cross each other at the intersection cr4. The roads r1 and r6 cross each other at the intersection cr5. The searched route Rt follows road r1 and turns left at the intersection cr5. The intersection cr5 is the turn intersection c1. The intersections cr1, cr3, and cr5 have the traffic lights sg1 through sg3, but the intersections cr2 and cr4 do not have traffic lights.

Figure 15:
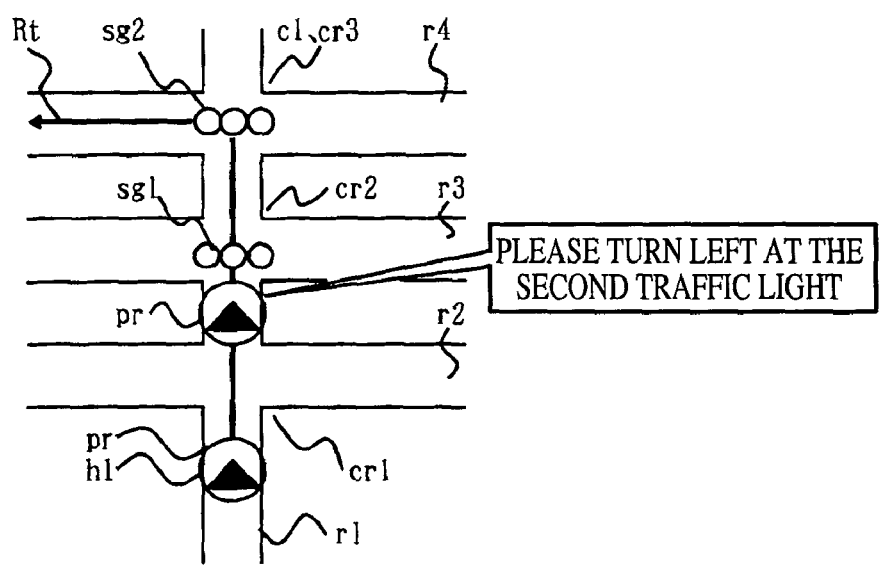
FIG. 15 is a diagram showing an example of guidance.

In FIG. 15, the roads r1 and r2 cross each other at the intersection cr1. The roads r1 and r3 cross each other at the intersection cr2. The roads r1 and r4 cross each other at the intersection cr3. The searched route Rt follows road r1 and turns left at the intersection cr3. The intersection cr3 is the turn intersection c1. The intersections cr2 and cr3 have the traffic lights sg1 and sg2, but the intersection cr1 does not have a traffic light.

According to the exemplary method (as applied to the above examples), it is determined whether the vehicle comes close to the turn intersection c1 and arrives at the predetermined route guidance point h1 (step S1). When the vehicle arrives at the predetermined route guidance point h1 (step S1=Yes), intersection data is read out and it is determined whether there is a traffic light at the turn intersection c1 (step S2).

If there is no traffic light at the turn intersection c1 (step S2=Yes), the number of the intersections crj is calculated. In this case, the turn intersection c1 is included in the intersections crj to be calculated. Then audio route guidance is output on the basis of the number of the intersections crj (step S3).

If there is a traffic light at the turn intersection c1 (step S2=No), it is determined whether there are traffic lights sgk at each of the intersections crj between the vehicle position pr and the turn intersection c1, that is, whether only the turn intersection c1 has a traffic light (step S4). When only the turn intersection c1 has a traffic light (step S4=Yes), route guidance is preformed and an audio message is output for the vehicle to turn right/left at a next intersection with traffic light (step S5). In this case, for example, as shown in FIG. 11, the turn intersection c1 is the only intersection with a traffic light among intersections between the vehicle position pr and the turn intersection c1, so that the audio message tells the driver to turn to right/left at the turn intersection c1.

If there is an intersection with a traffic light other than the turn intersection c1 (step S4=No), it is determined whether all of the intersections crj between the vehicle position pr and the turn intersection c1 have traffic lights (step S6). When all of the intersections crj between the vehicle position pr and the turn intersection c1 have traffic lights (step S6=Yes), route guidance is performed on the basis of the number of the intersections with traffic lights between the vehicle position pr and the turn intersection c1 and the number of such intersections is output by audio (step S7).

If an intersection among the intersections crj between the vehicle position pr and the turn intersection c1 has no traffic light (step S6=No), the route guidance is delayed and not performed at the route guidance point h1, and the vehicle goes through the closest intersection (step S8) and the method is repeated in this manner at each intersection until only the turn intersection c1 has a traffic light (step S4=Yes) or until all of the intersections crj between the vehicle position pr and the turn intersection c1 have traffic lights (step S6=Yes).

For example, in the example of FIG. 11, the turn intersection c1 has the traffic light sg1. Therefore, when the vehicle arrives at the route guidance point h1, it is determined whether each of the intersections cr1 through cr3 between the vehicle position pr and the turn intersection c1 have traffic lights. In this case, only the turn intersection c1 has the traffic light sg1 (step S2=Yes), so the CPU 31 performs the route guidance on the basis of the turn intersection c1 and outputs an audio message such as "Please turn left at the next traffic light."

Note that, if the turn intersection c1 does not have a traffic light in FIG. 11, the number of the intersections cr1 through cr3 between the vehicle position pr and the turn intersection c1 is counted when the vehicle arrives at the route guidance point h1. In this case, the number of the intersections cr1 through cr3 is three, so that the point guidance processing means outputs an audio message such as "Please turn left at the third intersection."

In an example of FIG. 12, when the vehicle arrives at the route guidance point h1, it is determined whether the intersections cr1 through cr3 between the vehicle position pr and the turn intersection c1 have traffic lights. In this case, all of the intersections cr1 through cr3 between the vehicle position pr and the turn intersection c1 have the traffic lights sg1 through sg3 (step S6=Yes), so the CPU 31 performs the route guidance on the basis of the number of the intersections cr1 through cr3 and outputs an audio message such as "Please turn left at the third traffic light," "Please turn left at the intersection with the third traffic light," or "Please turn left at the third intersection with traffic light."

In the example of FIG. 13, when the vehicle arrives at the route guidance point h1, it is determined whether the intersections cr1 and cr2 between the vehicle position pr and the turn intersection c1 have traffic lights. In this case, both of the intersections cr1 and cr2 between the vehicle position pr and the turn intersection c1 have the traffic lights sg1 and sg2 (step S6=Yes), so that the CPU 31 performs the route guidance on the basis of the number of the intersections cr1 and cr2 and outputs an audio message such as "Please turn left at the second traffic light."

In the example of FIG. 14, when the vehicle arrives at the route guidance point h1, it is determined whether the intersections cr1 through cr5 between the vehicle position pr and the turn intersection c1 have the traffic lights. In this case, the intersections cr1, cr3, and cr5 between the vehicle position pr and the turn intersection c1 have traffic lights sg1, sg3, and sg5, but the intersections cr2 and cr4 do not have traffic lights (steps S4 and S6=No). Therefore, the CPU 31 allows the vehicle to go through the closest intersection and delays the route guidance, that is, the route guidance is not performed at the route guidance point h1.

After that, it is repeatedly determined whether only the turn intersection has a traffic light (step S4) and whiter all intersections to the turn intersection have traffic lights (step S6). The CPU 31 repeatedly allows the vehicle to go through the nearest intersection until one of the conditions is met. When the vehicle goes through the intersection cr3 and arrives at the route guidance point h2, only the turn intersection c1 has the traffic light sg3, (step S4=Yes). Therefore, the CPU 31 performs the route guidance for the turn intersection c1 at the route guidance point h2 and outputs an audio message such as "Please turn left at the next traffic light." or "Please turn left at the next intersection with traffic light."

In the example of FIG. 15, when the vehicle arrives at the route guidance point h1, it is determined whether the intersections cr1 through cr3 between the vehicle position pr and the turn intersection c1 have traffic lights. In this case, the intersections cr2 and cr3 between the vehicle position pr and the turn intersection c1 have the traffic lights sg1 and sg2, but the intersection cr1 does not have a traffic light (steps S4 and S6=No). Therefore, the CPU 31 allows the vehicle to go through the closest intersection cr1 and delays the route guidance without performing the route guidance at the route guidance point h1.

Once the vehicle goes through the intersection cr1, both of the intersection cr2 and cr3 between the vehicle position pr and the turn intersection c1 have the traffic lights sg1 and sg2 (Step S6=Yes). Therefore, the CPU 31 performs the route guidance on the basis of the number of the intersections cr2 and cr3 and outputs an audio message such as "Please turn left at the second traffic light."

As described above, according to the exemplary method, it is determined whether guidance conditions are met in steps S2, S4, and S6 while the route guidance is performed. When one of steps S2, S4, or S6 is met, the route guidance whose content is preset corresponding to each of respective steps S3, S5, or S7 is performed, so that the driver may easily determine which intersection should be counted. Therefore, the driver may recognize the turn intersection c1 without a mistake.

According to the above examples, the number of the intersections crj between the vehicle position pr and the turn intersection c1 are calculated. However, the number of roads that cross the road r1 may be calculated instead of the number of the intersections crj between the vehicle position pr and the turn intersection c1. In such a case, the road that crosses the road r1 at the turn intersection c1 may be included in roads to be counted.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:
1. A route guidance system for a vehicle, comprising:
a current position detector that detects a current position of the vehicle; and
a controller that:
 searches for a route to a destination;
 provides route guidance about a target point in front of the target point on the searched route;
 determines whether there is a traffic light at the target point;
 determines whether there are traffic lights at each intersection between the vehicle position and the target point if there is the traffic light at the target point;
 determines whether (1) all of the intersections between the vehicle position and the target point have traffic lights, (2) some of the intersections between the vehicle position and the target point have traffic lights and some of the intersections between the vehicle position and the target point do not have traffic lights, and (3) all of the intersections between the vehicle position and the target point do not have traffic lights;
 outputs audio route guidance about the target point, if there is the traffic light at the target point, when (1) all of the intersections between the vehicle position and the target point have traffic lights or (3) all of the intersections between the vehicle position and the target point do not have traffic lights; and does not output audio route guidance about the target point, if there is the traffic light at the target point, when (2) some of the intersections between the vehicle position and the target point have traffic lights and some of the intersections between the vehicle position and the target point do not have traffic lights.

2. The route guidance system of claim 1, wherein:

if the traffic light is at the target point, the route guidance system outputs audio route guidance about the target point on a basis of the number of traffic lights between and including the vehicle position and the target point; and if the traffic light is not at the target point, the route guidance system outputs audio route guidance about the target point on a basis of only the number of intersections between and including the vehicle position and the target point.

3. A route guidance method for a vehicle, comprising:

detecting a current position of the vehicle;

searching for a route to a destination;

providing route guidance about a target point in front of the target point on the searched route;

determining whether there is a traffic light at the target point;

determining whether there are traffic lights at each intersection between the vehicle position and the target point if there is the traffic light at the target point;

determining whether (1) all of the intersections between the vehicle position and the target point have traffic lights, (2) some of the intersections between the vehicle position and the target point have traffic lights and some of the intersections between the vehicle position and the target point do not have traffic lights, and (3) all of the intersections between the vehicle position and the target point do not have traffic lights;

outputting audio route guidance about the target point, if there is the traffic light at the target point, when (1) all of the intersections between the vehicle position and the target point have traffic lights or (3) all of the intersections between the vehicle position and the target point do not have traffic lights; and not outputting audio route guidance about the target point, if there is the traffic light at the target point, when (2) some of the intersections between the vehicle position and the target point have traffic lights and some of the intersections between the vehicle position and the target point do not have traffic lights.

4. A computer-readable storage medium storing a computer-executable program, the program comprising:

instructions for detecting a current position of the vehicle;

instructions for searching for a route to a destination;

instructions for providing route guidance about a target point in front of the target point on the searched route;

instructions for determining whether there is a traffic light at the target point;

instructions for determining whether there are traffic lights at each intersection between the vehicle position and the target point if there is the traffic light at the target point;

instructions for determining whether (1) all of the intersections between the vehicle position and the target point have traffic lights, (2) some of the intersections between the vehicle position and the target point have traffic lights and some of the intersections between the vehicle position and the target point do not have traffic lights, and (3) all of the intersections between the vehicle position and the target point do not have traffic lights;

instructions for outputting audio route guidance about the target point, if there is the traffic light at the target point, when (1) all of the intersections between the vehicle position and the target point have traffic lights or (3) all of the intersections between the vehicle position and the target point do not have traffic lights; and instructions for not outputting audio route guidance about the target point, if there is the traffic light at the target point, when (2) some of the intersections between the vehicle position and the target point have traffic lights and some of the intersections between the vehicle position and the target point do not have traffic lights.

5. A route guidance system for a vehicle, comprising:

means for detecting a current position of the vehicle;

means for searching for a route to a destination;

means for providing route guidance about a target point in front of the target point on the searched route;

means for determining whether there is a traffic light at the target point;

means for determining whether there are traffic lights at each intersection between the vehicle position and the target point if there is the traffic light at the target point;

means for determining whether (1) all of the intersections between the vehicle position and the target point have traffic lights, (2) some of the intersections between the vehicle position and the target point have traffic lights and some of the intersections between the vehicle position and the target point do not have traffic lights, and (3) all of the intersections between the vehicle position and the target point do not have traffic lights;

means for outputting audio route guidance about the target point, if there is the traffic light at the target point, when (1) all of the intersections between the vehicle position and the target point have traffic lights or (3) all of the intersections between the vehicle position and the target point do not have traffic lights; and means for not outputting audio route guidance about the target point, if there is the traffic light at the target point, when (2) some of the intersections between the vehicle position and the target point have traffic lights and some of the intersections between the vehicle position and the target point do not have traffic lights.

6. The route guidance method of claim 3, further comprising:

outputting audio route guidance about the target point on a basis of the number of traffic lights between and including the vehicle position and the target point if the traffic light is at the target point; and outputting audio route guidance about the target point on a basis of only the number of intersections between and including the vehicle position and the target point if the traffic light is not at the target point.

\* \* \* \* \*